United States Patent
Barney

(10) Patent No.: US 12,488,947 B2
(45) Date of Patent: Dec. 2, 2025

(54) GROUNDING SYSTEM, GROUNDING COMPONENT, AND METHODS OF MANUFACTURING AND USING THE SAME

(71) Applicant: NIKE, Inc., Beaverton, OR (US)

(72) Inventor: Bruce Barney, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 541 days.

(21) Appl. No.: 17/974,051

(22) Filed: Oct. 26, 2022

(65) Prior Publication Data

US 2024/0145183 A1    May 2, 2024

(51) Int. Cl.
| | |
|---|---|
| *H01H 1/24* | (2006.01) |
| *B23Q 11/00* | (2006.01) |
| *H01B 1/02* | (2006.01) |
| *H01H 1/02* | (2006.01) |
| *H01H 1/58* | (2006.01) |

(52) U.S. Cl.
CPC ........... *H01H 1/24* (2013.01); *B23Q 11/0078* (2013.01); *H01B 1/026* (2013.01); *H01H 1/58* (2013.01); *H01H 1/02* (2013.01); *H01H 2225/01* (2013.01); *H01H 2231/048* (2013.01); *H01H 2239/018* (2013.01)

(58) Field of Classification Search
CPC .. H01H 1/24; H01H 1/58; H01H 1/02; H01H 2225/01; H01H 2231/048; H01H 2239/018; B23Q 11/0078; H01B 1/026
USPC .......................................................... 361/42
See application file for complete search history.

(56) References Cited

U.S. PATENT DOCUMENTS

| | | | | |
|---|---|---|---|---|
| 4,268,338 A | * | 5/1981 | Peterson | B29C 65/04 156/289 |
| 4,845,333 A | * | 7/1989 | Hidata | B23K 37/0461 219/80 |
| 4,921,568 A | * | 5/1990 | Whiffen | B23K 13/02 219/83 |
| 6,009,925 A | * | 1/2000 | Hall | B29C 66/81881 156/380.4 |
| 2007/0158342 A1 | * | 7/2007 | Verkindt | H05B 6/62 219/764 |

\* cited by examiner

*Primary Examiner* — Sreeya Sreevatsa
(74) *Attorney, Agent, or Firm* — Shook, Hardy & Bacon L.L.P.

(57) ABSTRACT

Grounding systems, grounding components, and methods of manufacturing, assembling, and using the same to provide dynamic and adaptable electrical grounding. In one aspect, an adaptable grounding system is provided. The grounding system may include a plurality of grounding components positioned to adaptively engage with an electrical-grounding surface, e.g., facilitating improved electrical contact. The grounding components may be mounted on a first structure which is opposite to a second structure that includes an electrical-grounding surface. The first structure and/or the second structure may be adjustable, e.g., between at least a first configuration, e.g., a non-grounded configuration, and a second configuration, e.g., a grounded configuration. The grounding systems, components, and related methods described herein may be used with different manufacturing systems and processes including those that are electrically-driven.

18 Claims, 11 Drawing Sheets

GROUNDING SYSTEM, GROUNDING COMPONENT, AND METHODS OF MANUFACTURING AND USING THE SAME

TECHNICAL FIELD

The field relates to electrical grounding.

BACKGROUND

There are some manufacturing tools that operate based on electrical current. When such tools are in use, electrical grounding can be used to help control the path of electricity. In some instances, manufacturing tools that use electrical current can experience degradation of their components due to electrical current passing through certain components, rather than through manufacturing materials, or through desired electrical grounding pathways. This can result in damage, reduced operational life, and additional maintenance cost for such manufacturing tools.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, grounding systems, grounding components, and methods of manufacturing and using the same. These aspects enable dynamic and/or adaptable electrical grounding under different circumstances, e.g., during different manufacturing operations. These aspects can be used to improve the functionality, durability, operational life, and/or effectiveness of manufacturing tools that use and/or apply electrical current, among other benefits.

In one aspect, an adaptable electrical grounding system is provided. The adaptable grounding system may include a first structure and a second structure. The first structure may include an electrical-grounding surface, e.g., one that is at least partially exposed, or contactable. The second structure may include an adaptable grounding component, or a plurality of adaptable grounding components, shiftable into contact with the electrical-grounding surface in adaptive fashion. In addition, in aspects, each adaptable grounding component may include a movable coupling and a conductive component that is mounted on the movable coupling. The movable coupling allows the conductive component to adjust its position, or rather, to adaptively reposition, e.g., to facilitate contact against an electrical-grounding surface. In addition, each adaptable grounding component can include at least one biasing element positioned to bias against the conductive component, e.g., in at least the direction of the electrical-grounding surface.

In additional aspects, the first structure and the second structure may be adjustable between a first configuration and a second configuration. In the first configuration, the electrical-grounding surface and the adaptable grounding component(s) are spaced apart. In the second configuration, the electrical-grounding surface and the adaptable grounding component(s) are at least partially in contact, e.g., with the conductive component(s) adaptively engaging the electrical-grounding surface. To adjust between the first configuration and the second configuration, the first structure, the second structure, or both may be shiftable, e.g., through operation of one or more translators and/or actuators coupled to the first structure and/or to the second structure. The adaptable grounding systems and methods described herein have been demonstrated to improve electrical grounding, e.g., reducing electrical arcing, reducing damage and/or degradation of components, and lengthening the operational life of manufacturing systems and equipment, among other benefits.

BRIEF DESCRIPTION OF THE DRAWINGS

The grounding systems, grounding components, and methods of manufacturing and using the same provided herein are described in detail in connection with the attached figures, which are intended to illustrate non-limiting examples, wherein.

DETAILED DESCRIPTION

This detailed description is provided in order to meet statutory requirements. However, this description is not intended to limit the scope of the invention described herein. Rather, the claimed subject matter may be embodied in different ways, to include different steps, different combinations of steps, different elements, and/or different combinations of elements, similar to those described in this disclosure, and in conjunction with other present or future technologies. In addition, although the terms "step" and "block" may be used herein to identify different elements of methods employed, the terms should not be interpreted as implying any particular order among or between different elements except when the order is explicitly stated.

In general, aspects herein relate to adaptable grounding systems, adaptable grounding components, and methods of manufacturing, assembling, and using the same, among other things. In one aspect, an adaptable grounding system includes a plurality of grounding components that can adaptively engage with a corresponding electrical-grounding surface (or surfaces). The grounding components can be configured to have different degrees of shiftability, adjustability, and/or articulation, e.g., to facilitate adaptable contact against an electrical-grounding surface. The use of the adaptable grounding systems described herein has been demonstrated to improve electrical grounding, e.g., resulting in reduced electrical arcing, reduced damage and/or degradation of components associated with an electrically-driven manufacturing operation, e.g., including electric generators, and increasing the operational life of associated manufacturing systems, among other benefits. FIGS. 1-10, described in detail below, illustrate non-limiting aspects that can achieve these benefits, among others.

Figure 1A:
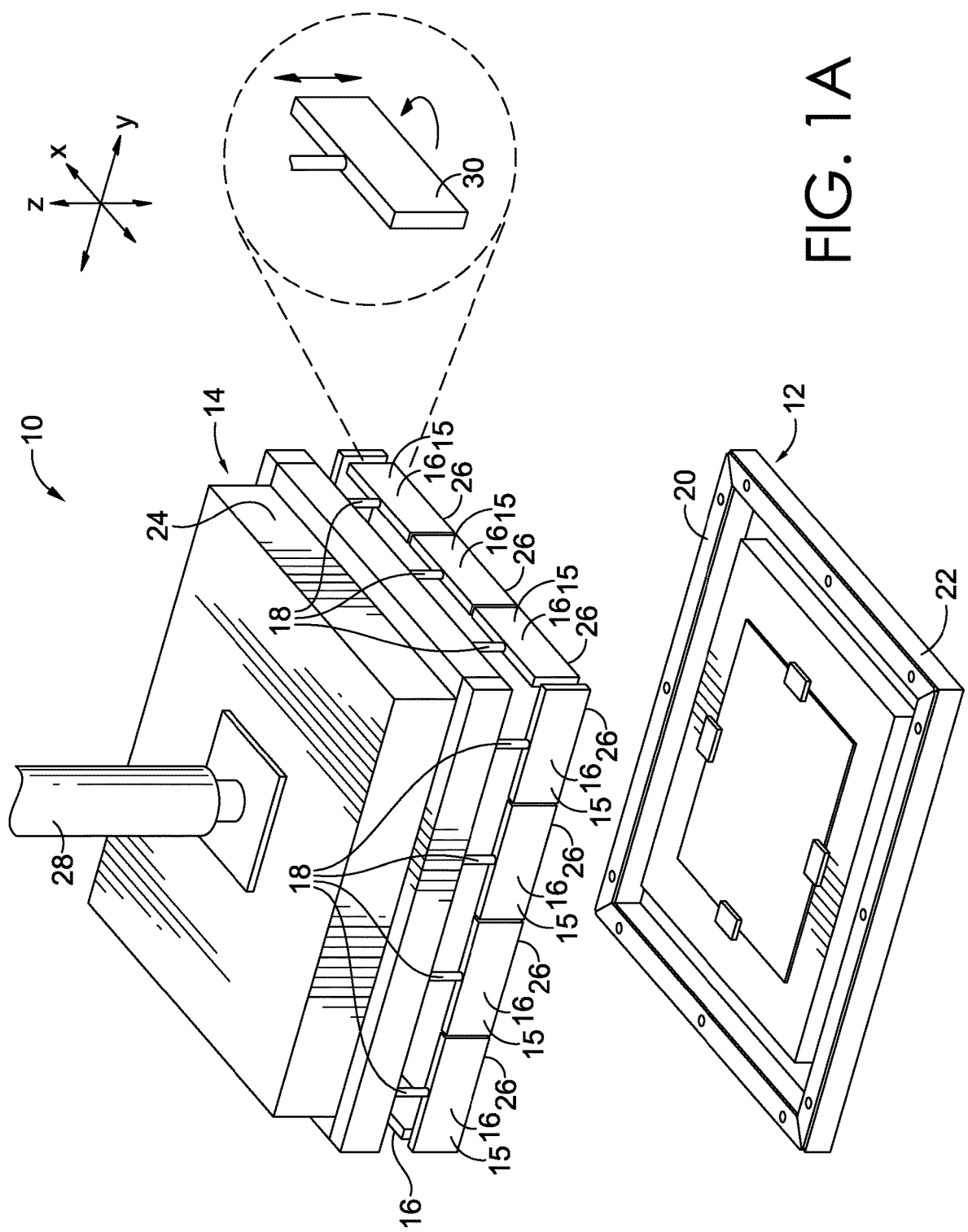
FIGS. 1A and 1B show an adaptable grounding system in different configurations, in accordance with an aspect hereof.
Figure 1B:
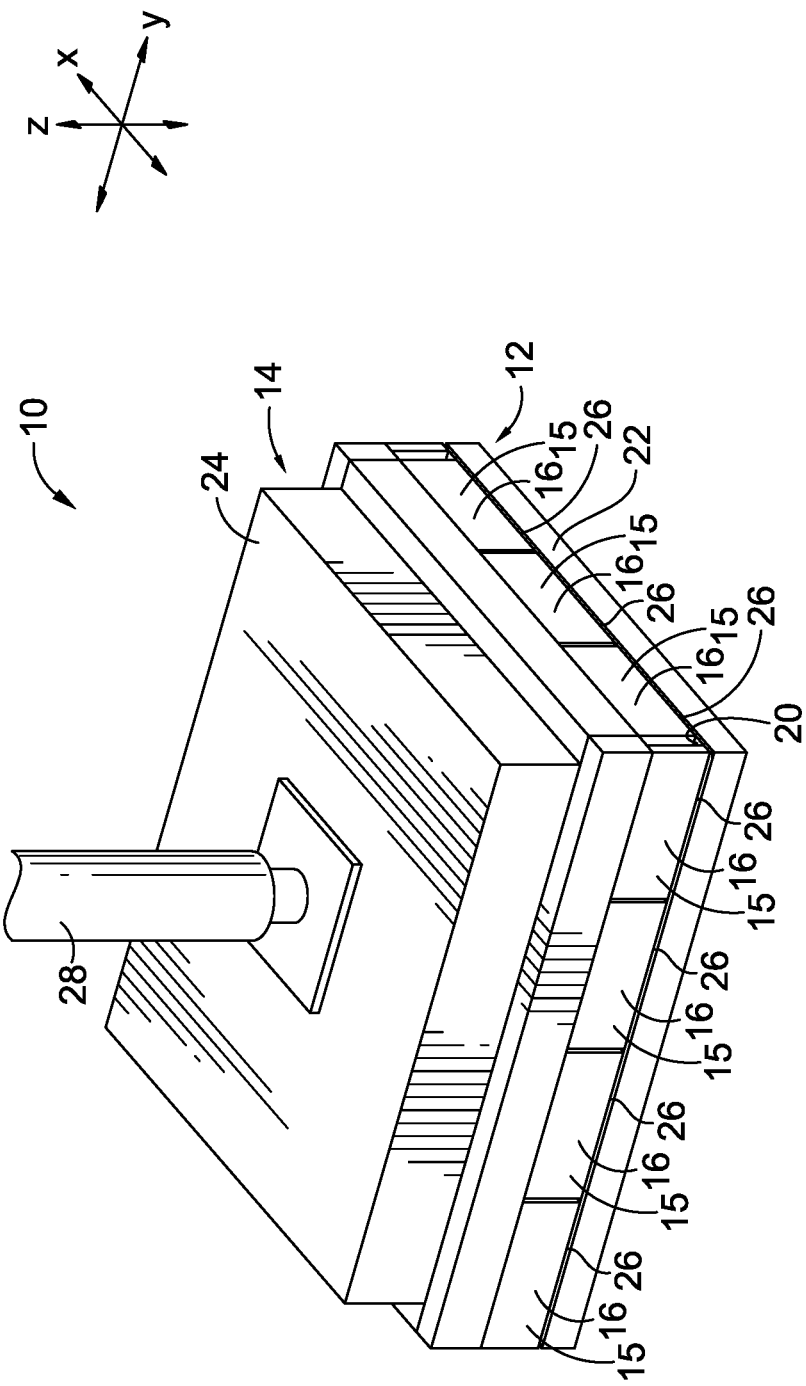

Looking at FIGS. 1A and 1B, an adaptable grounding system 10 is shown, in accordance with an aspect hereof. The system 10 shown in FIGS. 1A and 1B is depicted generically for clarity, explanation, and example purposes, and represents one of many possible configurations, which may include common or different combinations and/or sub-combinations of components and assemblies. These different configurations can be used to facilitate adaptable electrical grounding under different operational circumstances.

The system 10 is represented by multiple components. In particular, the system 10 includes a structure 12 with a frame 22, a structure 14 with a frame 24, and a plurality of adaptable grounding components 16. The adaptable grounding components 16 are mounted on the frame 24 such that each is independently adjustable in relation to the structure 14. In one aspect, the structure 12 and the frame 22 form a base, e.g., one that remains substantially stationary during operation of the system 10, and the structure 14 and the frame 24 form a housing, e.g., one that shifts the adaptable grounding components 35 to different positions during operation of the system 10, e.g., to facilitate adaptable electrical grounding.

The structure 12 includes an electrical-grounding surface 20. The electrical-grounding surface 20 may be formed of brass, copper, silver, gold, steel, stainless steel, aluminum, nickel, zinc, molybdenum, or another metal, metal alloy, or composite with electrical-conductivity properties suitable for electrical grounding. The electrical-grounding surface 20 extends generally about a perimeter of the frame 22 on the structure 12. In addition, the electrical-grounding surface 20 is at least partially exposed, e.g., such that it is engageable/contactable. The adaptable grounding components 16 are generally mounted about a perimeter of the frame 24 on the structure 14. The adaptable grounding components 16 and the electrical-grounding surface 20 are at least partially aligned along the z-axis, as identified in FIGS. 1A and 1B. This allows the components 16, 20 to be shifted into, and out of, electrical contact. In the aspect depicted in FIG. 1A, the electrical-grounding surface 20 is generally a continuous surface. However, in other aspects, the electrical-grounding surface 20 may be non-continuous or non-contiguous, e.g., having distinct, or at least partially separated, sections that are each electrically-grounded. In relation to the aspects herein, this may still be considered an electrical-grounding surface because each section is electrically-grounded. In other words, an electrical-grounding surface may include one continuous contact surface that is electrically-grounded or may include multiple distinct contact surfaces that are each electrically-grounded.

The adaptable grounding components 16 each include a conductive component 15 that is mounted on a corresponding movable coupling 18. The conductive components 15 may be blocks or other dimensional structures that are formed of brass, copper, silver, gold, steel, stainless steel, aluminum, nickel, zinc, molybdenum, or another metal, metal alloy, and/or composite with electrical-conductivity properties suitable for electrical grounding. The movable couplings 18 are mounted on the frame 24 of the structure 14. The movable couplings 18 can be configured to provide different degrees of adjustability. This, in turn, provides different degrees of adjustability to the conductive components 15. For example, in different aspects, the movable couplings 18 may allow the conductive components 15 to slide or translate along at least one axis (e.g., the x-axis, y-axis, and/or z-axis as identified in FIGS. 1A and 1B), and/or the movable couplings 18 may allow the conductive components 15 to pivot or rotate about at least one axis (e.g., the x-axis, y-axis, and/or z-axis as identified in FIGS. 1A and 1B). This adjustability allows for dynamic, or adaptable, engagement between the conductive components 15 and the electrical-grounding surface 20. FIG. 1A also includes an enlarged depiction of a particular conductive component 15, identified by element 30, illustrating the different degrees of adjustability that are possible with different configurations of the conductive components 15 shown in FIGS. 1A and 1B.

The system 10 is adjustable between different configurations, e.g., at least a first configuration and a second configuration. In one configuration, e.g., as shown in FIG. 1A, the conductive component 15 and the electrical-grounding surface 20 are spaced apart, or rather, are not in direct contact. This may represent a non-operational configuration, e.g., one in which electrical grounding is not initiated or not fully initiated. In another configuration, e.g., as shown in FIG. 1B, the conductive components 15 and the electrical-grounding surface 20 are shifted at least partially into contact, e.g., such that contact-surfaces 26 of the conductive components 15 are in contact with the electrical-grounding surface 20. This may represent an operational configuration, e.g., one in which electrical grounding is initiated or more fully initiated. This shifting between configurations may be facilitated using an actuator assembly or multiple actuator assemblies, e.g., coupled to the structure 12 and/or the structure 14.

In one aspect, e.g., as shown in FIGS. 1A and 1B, the structure 14 may be shifted using a translator 28. The translator 28 may be a linear actuator, a multi-axis robot, or another mechanism that imparts movement to the structure 14. The translator 28 may be mechanically, electrically, and/or pneumatically operated, and may operate in coordination with other components of a manufacturing system. For example, the translator 28 may be coupled to a computing device that directs operation of the translator 28 and/or other components, e.g., a manufacturing tool that operates in connection with the system 10, and/or a transport mechanism that shifts manufacturing parts into position for processing by the system 10, in addition to other possible components.

It is contemplated that different components of the system 10 may shift to facilitate the different operational configurations. For example, in one contemplated aspect, the structure 12 is shiftable along the z-axis as identified in FIGS. 1A and 1B, e.g., through operation of a translator or other shifting mechanism coupled to the structure 12, while the structure 14 remains in fixed position; in another contemplated aspect, the structure 14 is shiftable along the z-axis as identified in FIGS. 1A and 1B, e.g., through operation of a translator or other shifting mechanism coupled to the structure 14, while the structure 12 remains in fixed position; and in another contemplated aspect, both the structure 12 and the structure 14 are shiftable along the z-axis as shown in FIGS.

1A and 1B, e.g., through operation of a single translator/shifting mechanism or through operation of multiple translators/shifting mechanisms.

The movable couplings 18 may have different configurations. For example, the movable couplings 18 may each include a slidable coupling, e.g., one that allows the conductive component 15 to slide along at least one axis, e.g., the z-axis as identified in FIGS. 1A and 1B. In one aspect, this sliding motion is provided by a pin-and-slot assembly. For example, in one such configuration, the pin is mounted on the frame 24 and the slot is formed in the conductive component 15; or, in another configuration, the pin is mounted on the conductive component 15, and the slot is formed in the frame 24. In either configuration, the pin is constrained by, and slidable along, the slot, thereby allowing for a limited range of linear movement. This linear movement also changes the relative positions of the conductive component 15 and the frame 24, which allows for adaptable positioning. In one aspect, the slot may be elongated with the long axis oriented along the z-axis as identified in FIGS. 1A and 1B. This allows the conductive components 15 to slide toward, or away from, the electrical-grounding surface 20, e.g., to facilitate adaptable engagement as shown in FIG. 1B. In different aspects, the aforementioned linear movement can also be provided using a track, a male-female translation mechanism, or another linear movement-enabling configuration.

The pin-and-slot discussed in the preceding paragraph should be interpreted broadly and to encompass a number of different structures, e.g., those of different shapes, sizes, and/or those formed of single or multiple elements. For example, in different aspects, the pin may be a bolt, e.g., a shoulder bolt, or may be a fastener, e.g., a screw, a plug, a rivet, or the like, or the pin may be another elongated structure. The "slot" may be an elongated slot defined by an outer edge of different possible shapes. For example, the edge of the slot may form a circular, oval, elliptical, or race-track shape, or another symmetrical or irregular shape. The edges defining the slot may be formed of conductive materials, e.g., such as brass, copper, silver, gold, steel, stainless steel, aluminum, nickel, zinc, molybdenum, and/or another metal, metal alloy, and/or composite with electrical-conductivity properties suitable for electrical grounding. The pin may also include such materials, and/or may include insulating or substantially non-conductive materials (e.g., those not suitable for electrical grounding). For example, the pin may be formed of plastic or another polymer-based material (e.g., such as Poly-Ether-Ketone or "PEEK"), ceramic, wood, or other materials that are substantially non-conductive. The pin may also have an inner portion that is formed of a first material, e.g., a metal, alloy, and/or composite, and an outer portion that is formed of an insulating or substantially non-conductive material, as described above. The aforementioned examples of pins and slots are intended to be non-limiting.

The movable couplings 18 may each include a pivotal coupling that allows the conductive component 15 to pivot about at least one axis (e.g., the x-axis, y-axis, and/or z-axis as identified in FIGS. 1A and 1B). This pivoting/rotating movement can be provided with a hinge, a pivot-linkage, a flexible connection, or another pivoting element. In one aspect, the pivotal coupling may allow the conductive component 15 to pivot about the y-axis and/or the x-axis as identified in FIGS. 1A and 1B. This can help facilitate adaptable engagement between the conductive component 16 and the electrical-grounding surface 20, e.g., as shown in FIG. 1B. In additional aspects, the movable couplings 18 may provide a combination of pivoting and sliding movement.

Looking still at FIGS. 1A and 1B, the conductive components 15 may be biased, e.g., along at least one axis, and/or about at least one axis. This may further facilitate adaptable positioning against the electrical-grounding surface 20. For example, in one instance, the conductive components 15 may be biased along the z-axis, as identified in FIGS. 1A and 1B, and in the direction of the electrical-grounding surface 20. In another instance, each conductive component 15 may be biased in opposite rotational directions (e.g., by a pair of biasing elements mounted generally on opposite sides of a movable coupling 18). This biasing may be provided by springs, elastic members, magnets, pre-tensioning of materials forming the components, and/or with other techniques. This biasing can help facilitate adaptable engagement of the conductive components 15 and the electrical-grounding surface 20.

Looking now at FIG. 1B, the system 10 is shown in the operational configuration, in accordance with an aspect hereof. FIG. 1B, in particular, shows the structure 12 and the structure 14 positioned such that the conductive components 15 are in adapted contact with the electrical-grounding surface 20 (the surface 20 is generally obscured in FIG. 1B). The movable couplings 18 (also obscured in FIG. 1B) are allowing the conductive components 15 to be adjusted into positions that provide more direct, or more distributed, contact with the electrical-grounding surface 20. In other words, the adjustment of the conductive components 15 on the movable couplings 18 allows the contact-surfaces 26 to more directly or completely contact the electrical-grounding surface 20. To accomplish this, the conductive components 15 may shift along at least one axis, e.g., the z-axis as identified in FIG. 1B, and/or may pivot about at least one axis, e.g., about the x-axis and/or y-axis as identified in FIG. 1B, depending on the configuration of the movable couplings 18.

The adaptable grounding components 16 may be assembled on the frame 24 so that there is a minimum tolerance or gap between adjacent conductive components 15 and/or between the conductive components 15 and the frame 24. For example, in some aspects, this tolerance or gap may be between $\frac{1}{1000}$ of an inch and $\frac{1}{10}$ of an inch, in addition to other possible distances, to allow for shifting, articulation, and/or pivoting of the conductive components 15 during a grounding process. In addition, each conductive component 15 may be pivotal on its movable coupling 18, e.g., about the x-axis, y-axis, and/or z-axis, as identified in FIGS. 1A and 1B, e.g., being pivotal at least 1-10 degrees in different aspects, to support adaptable engagement. In addition, FIGS. 1A and 1B show the structure 14 generally forming an enclosure. In some aspects, this enclosure may surround a processing area, e.g., a location where a manufacturing operation occurs, e.g., using an electrically-driven manufacturing tool. In such instances, the system 10 may be used to provide adaptable grounding while manufacturing processes are performed in the processing area.

Figure 2:
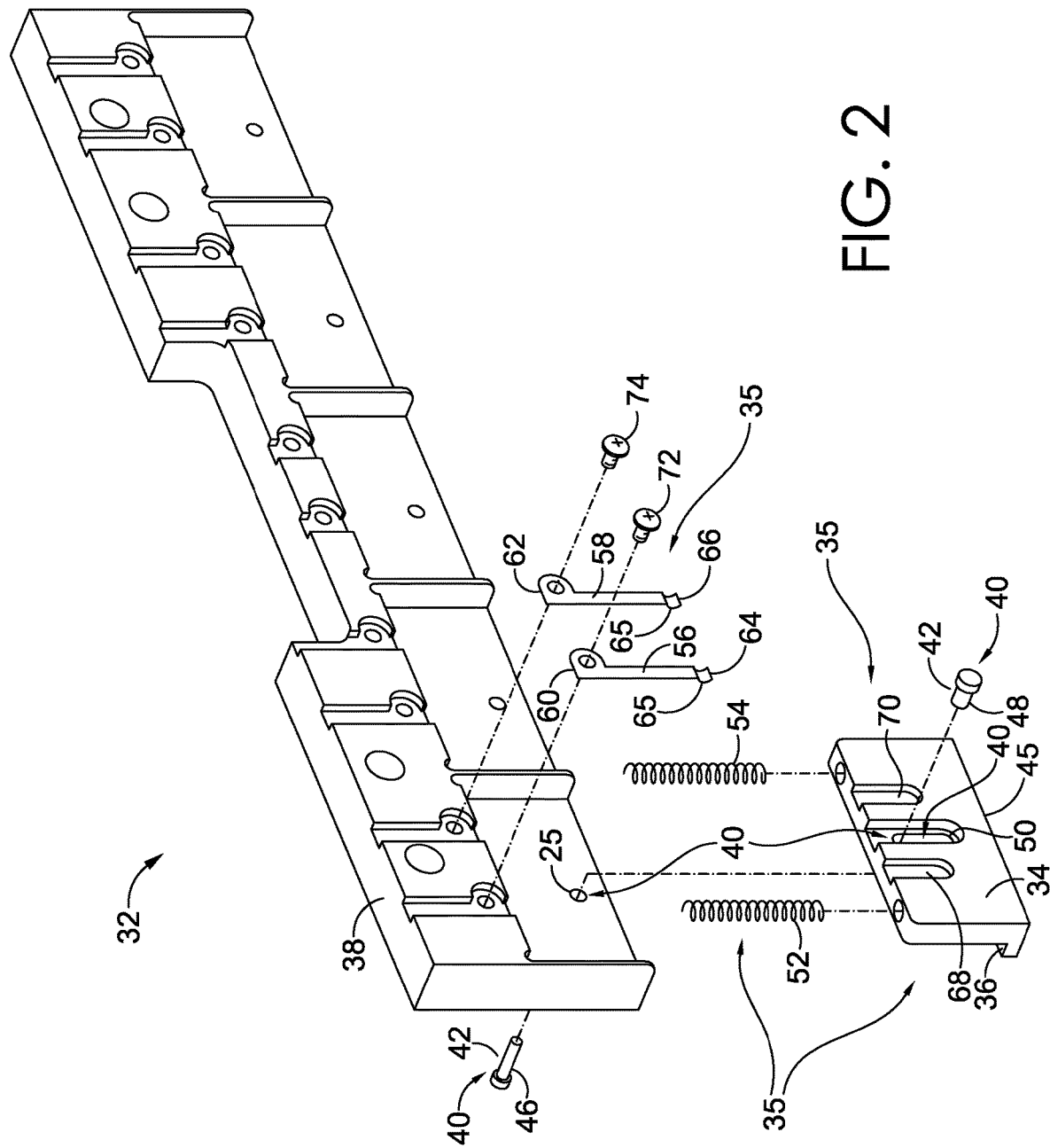
FIG. 2 depicts an adaptable grounding component in exploded form, and an assembly for the same, in accordance with an aspect hereof.
Figure 3:
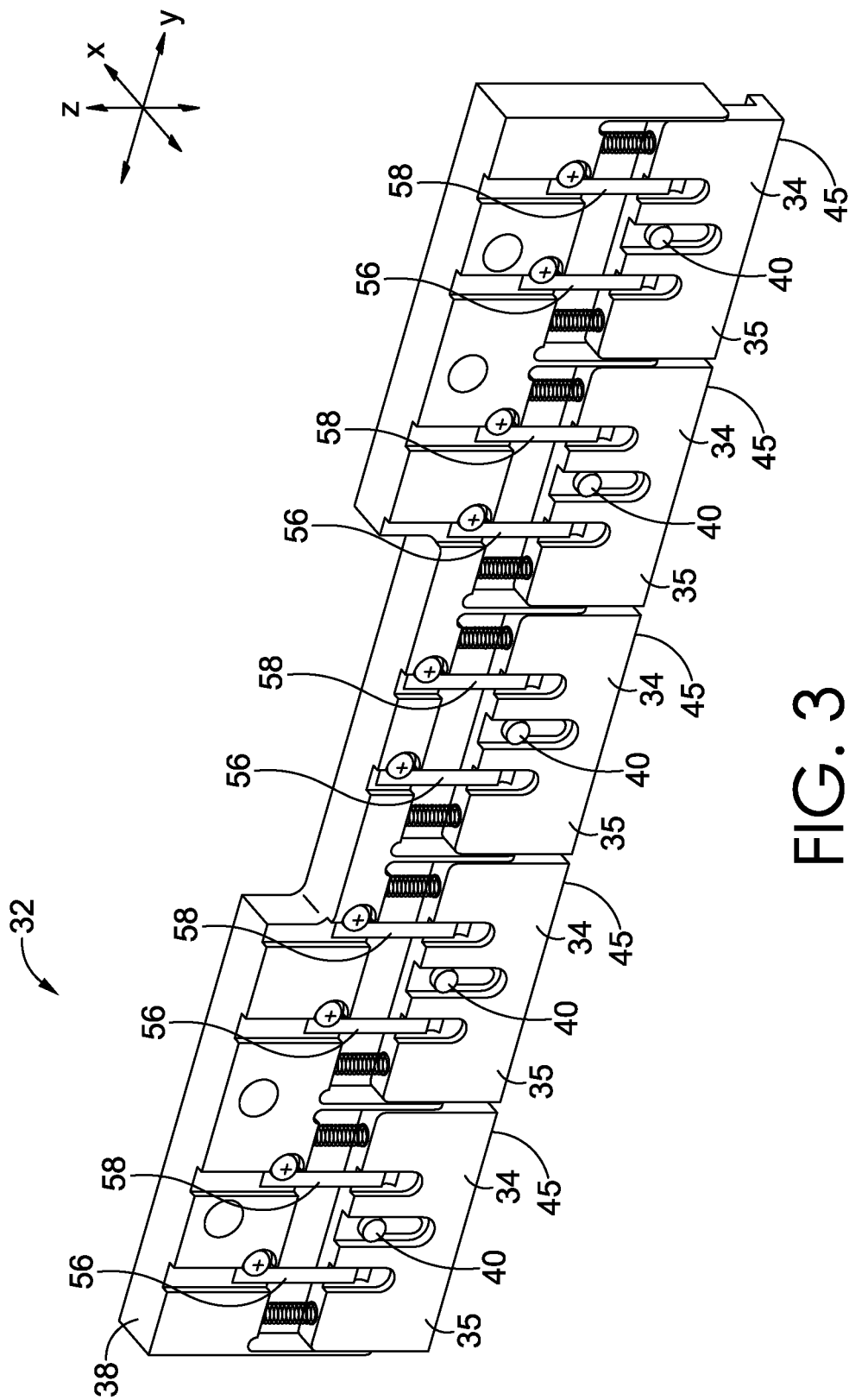
FIG. 3 depicts a plurality of adaptable grounding components mounted on an assembly, in accordance with an aspect hereof.

Looking now at FIG. 2, part of an assembly 32 for an adaptable grounding system, e.g., such as the system 10 shown in FIGS. 1A and 1B, is provided, in accordance with an aspect hereof. In FIG. 2, some components of the assembly 32 are omitted, and some components of the assembly 32 are shown in exploded form, for clarity and explanation purposes. FIG. 3 depicts the assembly 32 with these components integrated. In some aspects, the assembly 32 shown in FIG. 2 may be positioned along one or more sides of an adaptable grounding system, e.g., forming an enclosure where electrically-driven manufacturing processes can be performed.

The assembly 32 shown in FIG. 2 includes an adaptable grounding component 35. The adaptable grounding component 35 is shown in exploded form in FIG. 2. The assembly 32 also includes a support structure 38. The adaptable grounding component 35 is mounted to the support structure 38, e.g., as shown in FIG. 3. FIG. 3 also depicts a sequence of adaptable grounding components 35 installed along the support structure 38 for coordinated use. In different aspects, the support structure 38 may have different configurations. For example, in one aspect, the support structure 38 may be distinctly formed, and then attached to an adaptable grounding system, e.g., such as the system 10 shown in FIGS. 1A and 1B. In another aspect, the support structure 38 may be formed as an integral part of an adaptable grounding system, e.g. such as the system 10 shown in FIGS. 1A and 1B. The support structure 38 may be formed of a conductive material, e.g., a conductive metal, metal alloy, and/or composite, e.g., such as aluminum, steel, stainless steel, or a related alloy, or any of the other conductive materials listed herein. This allows the support structure 38 to facilitate an electrical connection between the adaptable grounding components 35 and any electrically-driven elements of the associated grounding system.

FIG. 2 depicts a conductive component 34 that is part of the adaptable grounding component 35. FIG. 3 shows an assembly of adaptable grounding components 35 each with a corresponding conductive component 34. The conductive component 34 can be a block, pad, or other dimensional structure. The conducive component 34 is formed, at least partially, of a conductive material, e.g., a conductive metal, metal alloy, and/or composite. For example, the conductive component 34, like other conductive elements described herein, may be formed of silver, gold, brass, copper, aluminum, molybdenum, nickel, steel, stainless steel, and/or another metal, metal alloy, and/or composite that provides a minimum level of electrical conductivity (e.g., as measured by the testing method ASTM-E1004-09) suitable for electrical grounding. The conductive component 34 includes a contact-surface 45 that is also formed of the conductive material. The contact-surface 45 of the conductive component 34 is sized, shaped, and oriented so that it can engage with an electrical-grounding surface, e.g., such as the surface 20 shown in FIGS. 1A and 1B, to thereby establish an electrical connection for grounding.

Looking still at FIG. 2, the adaptable grounding component 35 includes a movable coupling 40, a plurality of which are shown in FIG. 3. The movable coupling 40 is represented as an assembly of different components, as shown in FIG. 2. The conductive component 34 is mounted on the movable coupling 40, as shown in FIG. 3. The movable coupling 40 allows the conductive component 34 mounted thereon to adjust position (e.g., allowing it to slide, pivot, and/or otherwise shift to facilitate adaptable contact). In the aspect depicted in FIGS. 2 and 3, the movable coupling 40 allows the conductive component 34 to both slide and rotate. To enable this, the movable coupling 40 includes a pin 42 (e.g., depicted as a bolt) and a slot 44 (e.g., depicted as a racetrack shape defined by an edge 50).

The pin 42 includes an inner portion 46 and an outer portion 48 that attach together through an aperture 25 in the support structure 38. The portion 48 is designed to mount over the portion 46 and be attached. The portions 46, 48, attached within the aperture 25, thus retain the movable coupling 40 in place because each portion 46, 48 includes a raised edge that restricts movement through the aperture 25. The pin 42, extending through the aperture 25, is positioned within the slot 44 formed in the conductive component 34. This is shown most clearly in FIG. 3. The slot 44, and the edge 50 thereof, thus slidably constrains the pin 42 in the slot 44. The pin 42 is then able to translate, or slide, along the slot 44 a limited distance. In addition, the conductive component 34 is able to rotate about the pin 42 a limited rotational distance. This sliding of the pin 42 within the slot 44 and rotating of the conductive component 34 about the pin 42 allows a relative position of the conductive component 34 and the support structure 38 to change. This adjustability of position allows a contact-surface 45 of the conductive component 34 to adaptively engage with an electrical-grounding surface, e.g., such as the surface 20 show in FIG. 1A.

The assembly 32 shown in FIGS. 2 and 3 includes additional components that enable adaptable positioning of the conductive components 34. In particular, the assembly 32 includes a pair of biasing elements 52, 54 mounted to bias against the conductive component 34. The biasing elements 52, 54 are mounted in spaced-apart relation between the support structure 38 and the conductive component 34. In different aspects, the biasing elements 52, 54 may be springs, elastic structures, magnets, or similar elements that provide a biasing force. The biasing elements 52, 54 shown in FIG. 3 are mounted generally on opposite sides of the movable coupling 40. This allows the biasing elements 52, 54 to bias the conductive component 34 in a common direction along the z-axis, as identified in FIG. 2. In addition, this also allows the biasing elements 52, 54 to bias the conductive component 34 in opposite rotational directions about the movable coupling 40, or rather, about the pin 42. In other words, the biasing element 52 biases the conductive component 34 in one rotational direction about the pin 42, and the biasing element 54 biases the conductive component 34 in the opposite rotational direction about the pin 42. This combination of downward/opposite rotational biasing allows the contact-surface 45 of the conductive component 34 to more adaptively shift position and engage with an electrical-grounding surface during a grounding operation. In addition, to facilitate this surface-to-surface contact, the conductive component 34 may include an L-shaped extension 36, e.g., as shown in FIG. 2, that includes the contact-surface 45. The L-shaped extension may help increases the cross-section of the contact-surface 45 that engages with the electrical-grounding surface.

It should be noted that while a pair of biasing elements 52, 54 are shown in FIGS. 2 and 3, in additional aspects, a single biasing element, or a larger number of biasing elements, may be used to facilitate adaptable positioning of a conductive component, e.g., such as the conductive component 34. In addition, the conductive component 34 shown in FIGS. 2 and 3 is represented as a block of a particular shape, size, and surface contour, but numerous additional configurations are possible and contemplated in different aspects.

Looking still at FIGS. 2 and 3, the assembly 32 includes components that help maintain electrical contact between the support structure 38 and the conductive component 34, e.g., when the conductive component 34 changes position on the movable coupling 40. For example, as shown in FIG. 2, the assembly 32 includes a pair of elongated conductive-elements 56, 58. The elongated conductive-elements 56, 58 are mounted on the support structure 38 in spaced-apart relation, and generally on opposite sides of the movable coupling 40. The elongated conductive-elements 56, 58 each include a base 60, 62 that is coupled to the support structure 38 with a corresponding fastener 72, 74. The fasteners 72, 74 may be screws, bolts, rivets, or similar attachment structures. In addition, in different aspects, each base 60, 62 may be fixed in position, or may be movable, e.g., rotatable a limited amount, e.g., to facilitate substantially continuous contact with the conductive component 34 when components are shifting. In additional aspects, the elongated conductive-elements 56, 58 may be welded, bonded, or otherwise attached or integrally formed with the support structure 38. The elongated conductive-elements 56, 58 each include a distal end 64, 66. The distal ends 64, 66 are positioned so that each generally maintains contact with the conductive component 34, e.g., including when the conductive component 34 is adjusting position on the movable coupling 40. The elongated conductive-elements 56, 58 may be formed of a conductive material, e.g., a conductive metal, metal alloy, and/or composite. In one aspect, the elongated conductive-elements 56, 58 may be formed of beryllium copper, and the conductive component 34 may be formed of brass. This combination of materials has demonstrated favorable electrical transfer, wear-resistance, and durability in repeated operational use, among other benefits. Other materials and combinations of materials are contemplated herein as well.

In FIGS. 2 and 3, it can be seen how the distal ends 64, 66 of the elongated conductive-elements 56, 58 are positioned in corresponding recesses 68, 70 formed in the conductive component 34. The distal ends 64, 66 each include a curved, or contoured, tip section 65, 75. This shape allows the distal ends 64, 66 to engage against sidewalls of the corresponding recesses 68, 70. To help maintain substantially continuous contact between the elongated conductive-elements 56, 58 and the conductive component 34, the elongated conductive-elements 56, 58 may be biased against the sidewall of the recesses 68, 70 (e.g., through use of biasing elements coupled to the elements 56, 58, through pre-tensioning of the elements 56, 58, through use of an interference tolerance between the elements 56, 58 and the component 34, or through another similar technique). With this configuration, as the conductive component 34 shifts, e.g., along the z-axis as identified in FIG. 2, and/or about the x-axis or y-axis as identified in FIG. 2, the elongated conductive-elements 56, 58 may remain substantially in contact with the conductive component 34 within the recesses 68, 70. This may help facilitate a substantially continuous electrical connection, e.g., for electrical grounding.

FIG. 3 shows the assembly 32 with multiple adaptable grounding components 35 mounted on the support structure 38. In this assembled configuration, each adaptable grounding component 35 is able to independently reposition, adjust, and/or articulate. This allows each adaptable grounding component 35 to adaptively, or rather uniquely, engage with a different section of an electrical-grounding surface. For example, during such an operation, the conductive components 34 may contact an electrical-grounding surface, and with such contact, each may shift along the z-axis, and/or about the x-axis, y-axis, and/or z-axis, to provide dynamic, or more adapted, engagement with the electrical grounding-surface. In addition, as such adaptable engagement and shifting occurs, the elongated conductive-elements 56, 58 substantially maintain an electrical connection between the support structure 38 and their corresponding conductive component 34 that is engaged with the electrical grounding-surface.

The adaptable grounding components 35 may be used in different configurations. For example, in one aspect, a single adaptable grounding component 35 may be used in a grounding configuration, along with a correspondingly modified support structure. In other aspects, a plurality of adaptable grounding components 35 may be used in a grounding configuration, e.g., in a linear arrangement or in a multi-axis arrangement, along with a correspondingly modified support structure. FIG. 3 shows the assembly 32 with a sequence of five adaptable grounding components 35 arranged for adaptable grounding. However, this represents only one possible configuration, and many other configurations are contemplated herein for different electrical grounding operations and scenarios.

Figure 4:
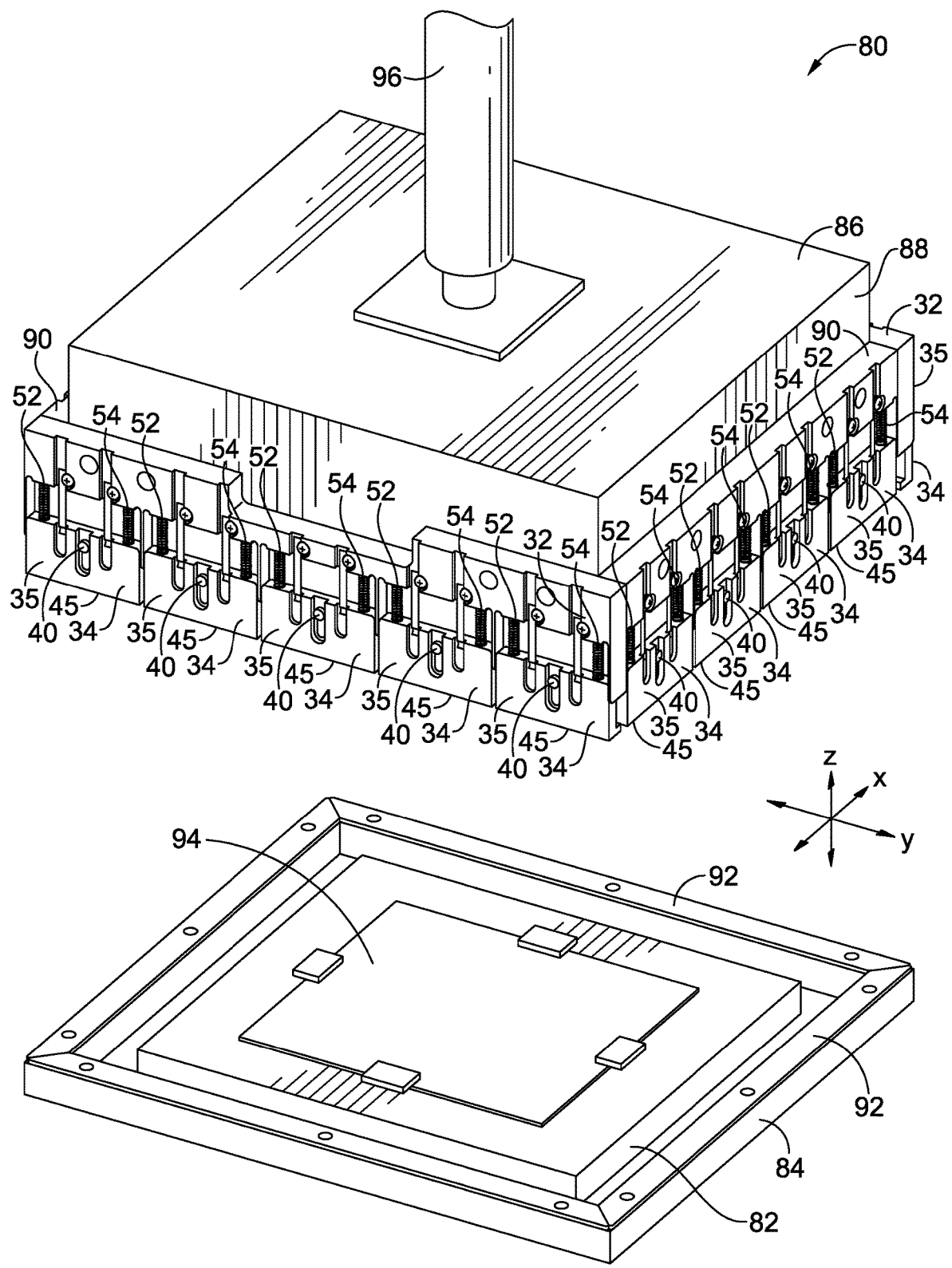
FIG. 4 depicts another adaptable grounding system in one operational configuration, in accordance with an aspect hereof.
Figure 5:
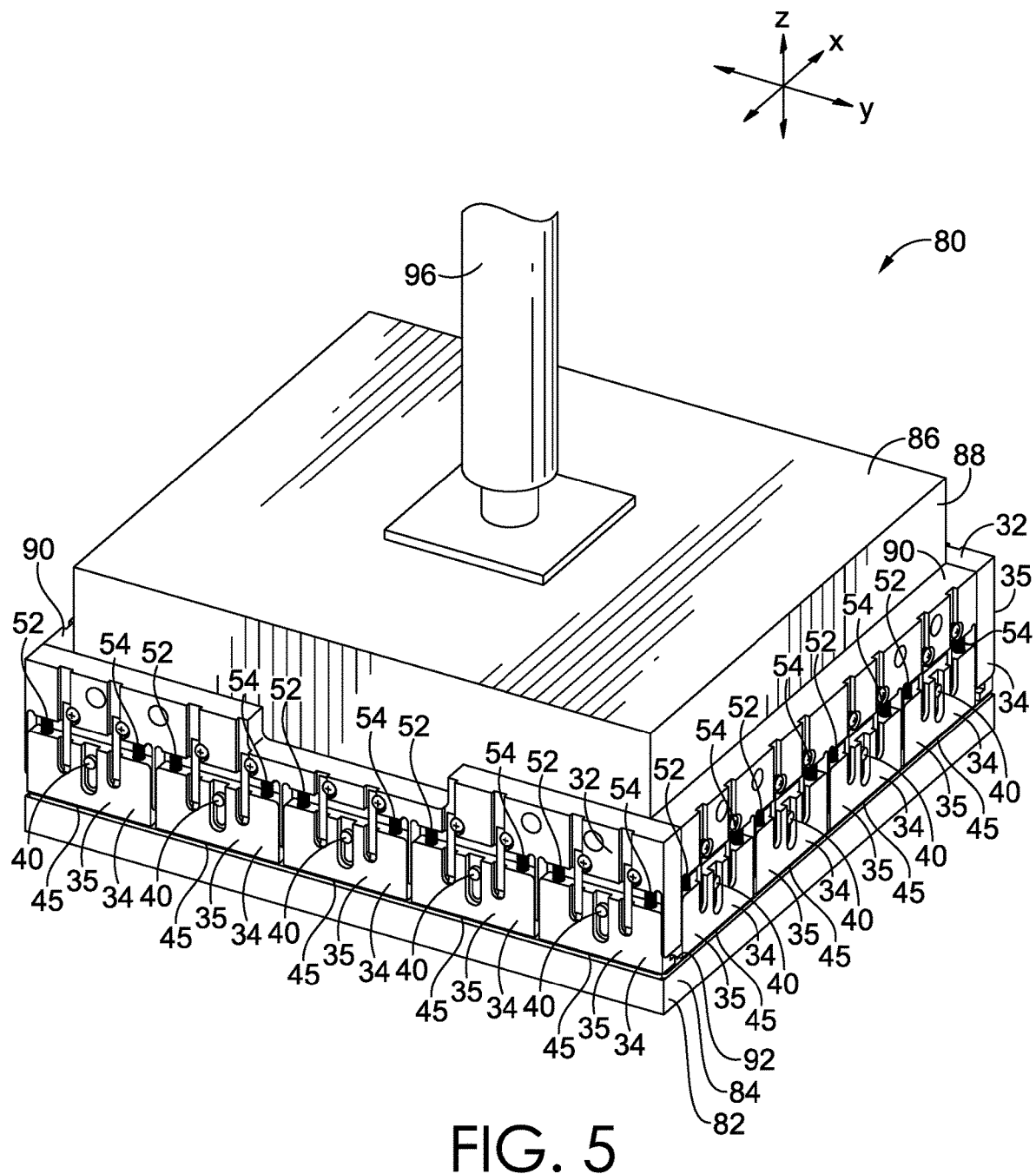
FIG. 5 depicts the adaptable grounding system of FIG. 4 in another operational configuration, in accordance with an aspect hereof.

Looking now at FIGS. 4 and 5, an adaptable grounding system 80 is shown, in accordance with an aspect hereof. The system 80 includes a structure 82 with a frame 84, and a structure 86 with a frame 88 (e.g., which may form part of a housing, e.g., that encloses an electrically-driven manufacturing tool). The assembly 32 shown in FIGS. 2 and 3 is integrated on opposite sides of the structure 86, and in addition, similar assemblies 90 are integrated on orthogonally-located opposite sides of the structure 86. This configuration allows the structure 86, including the assemblies 32, 90, and the adaptable grounding components 35 coupled thereto, to substantially form an enclosure. In some aspects, an electrically-driven manufacturing tool may be mounted at least partially in the enclosure. The structure 82 includes an electrical-grounding surface 92 that is at least partially exposed on the frame 84, and that is substantially aligned (across the x-y plane as shown in FIGS. 4 and 5) with the plurality of adaptable grounding components 35. In different aspects, the structure 82 and/or the structure 86 may be movable to facilitate different configurations, e.g., including at least a first configuration, shown in FIG. 4, and a second configuration, shown in FIG. 5.

Looking at FIG. 4, it can be seen that the structures 82 and/or 86 are shifted (e.g. either or both depending on the particular configuration) such that the adaptable grounding components 35 are displaced from the electrical-grounding surface 92. This may represent a non-operational configuration, e.g., one in which electrical grounding is not initiated or not fully initiated. This configuration may allow for interaction with a processing area 94 within the system 80. The processing area 94 may be a location where manufacturing parts are placed, processed, and then removed, e.g., in a repeating sequence. For example, during manufacturing operations, different manufacturing parts may pass through the processing area 94. This transfer of manufacturing parts may be provided with a robot, e.g., a multi-axis robot, a conveyor, a carousel, and/or an elevator, among other automated or semi-automated part-transfer mechanisms. The system 80 may also be adapted with different manufacturing tools. This includes tools that use electrical current or that process manufacturing parts using electrical current. For example, the system 80 may include a welding tool, e.g., one adapted for radio-frequency ("RF") welding, ultrasonic welding, or heat-welding, and/or may include laminating tools, bonding tools, printing tools, cutting tools, painting tools, or other electrically-based or electrically-driven manufacturing tools without limitation.

Looking at FIG. 5, it can be seen that the structures 82 and/or 86 are shifted (e.g. either or both depending on the particular configuration) so that the adaptable grounding components 35 are in contact with the electrical-grounding surface 92. This may represent an operational configuration, e.g., one in which electrical grounding is initiated or more fully initiated. In one aspect, structure 82 may remain fixed, e.g., operating as a stationary base, and structure 86 may shift, e.g., operating as a movable frame or housing, e.g., being shifted by a translator 96. The translator 96 may be a robot arm, linear actuator, or other mechanism that is electrically, mechanically, pneumatically, and/or hydraulically driven. In different aspects, the translator 96 may be manually controlled and/or computer-controlled, e.g., operating as part of an automated manufacturing operation. In the configuration shown in FIG. 5, the adaptable grounding components 35, and more particularly, the conductive components 34 that are adjustably positioned on the movable couplings 40, and biased by the biasing elements 52, 54, are in adapted contact with the electrical-grounding surface 92, with each being independently adjusted on its movable coupling 40 for adapted contact. This can provide a more direct, more complete, and/or more distributed engagement between the surfaces 45, 92 at each adaptable grounding component 35, which may allow for improved electrical contact and grounding.

Figure 6:
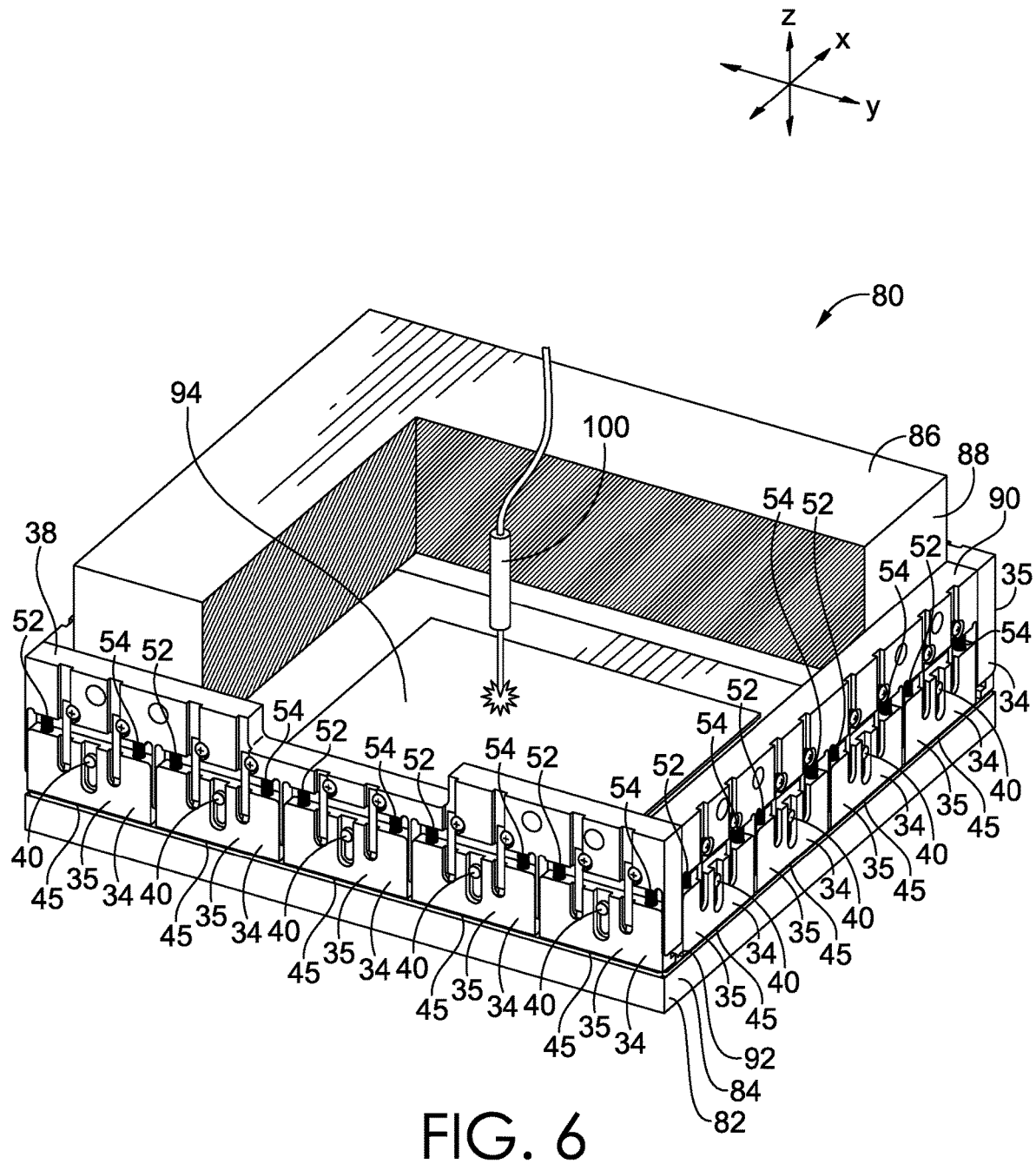
FIG. 6 depicts the adaptable grounding system of FIGS. 4 and 5, but with a portion of the adaptable grounding system omitted to illustrate operation of an integrated manufacturing tool, in accordance with an aspect hereof.

Looking now at FIG. 6, the adaptable grounding system 80 shown in FIGS. 4 and 5 is depicted, with a portion omitted to show operation of an integrated manufacturing tool 100, in accordance with an aspect hereof. The manufacturing tool 100 may be one adapted to perform any of a plurality of different electrically-driven manufacturing processes. For example, the tool 100 may be configured for welding, laminating, cutting, heating, painting, or another manufacturing-related process, e.g., including those that directly apply electrical current to manufacturing parts. The configuration shown in FIG. 6, like the configuration shown in FIG. 5, facilitates dynamic, or adaptable, electrical grounding. This is enabled by the independent articulation of the conductive components 34 at their corresponding movable couplings 40, as described herein, which provides more direct, and/or fully engaged, electrical contact between the adaptable grounding components 35 and the electrical-grounding surface 92 which are in contact. While in the configuration shown in FIG. 6, the manufacturing tool 100 may be operated. Then, electrical current sent through, or applied by, the manufacturing tool 100, e.g., to a manufacturing part, can be electrically grounded through an electrical grounding path that passes through the adaptable grounding components 35 and the electrical grounding-surface 92.

Figure 7:
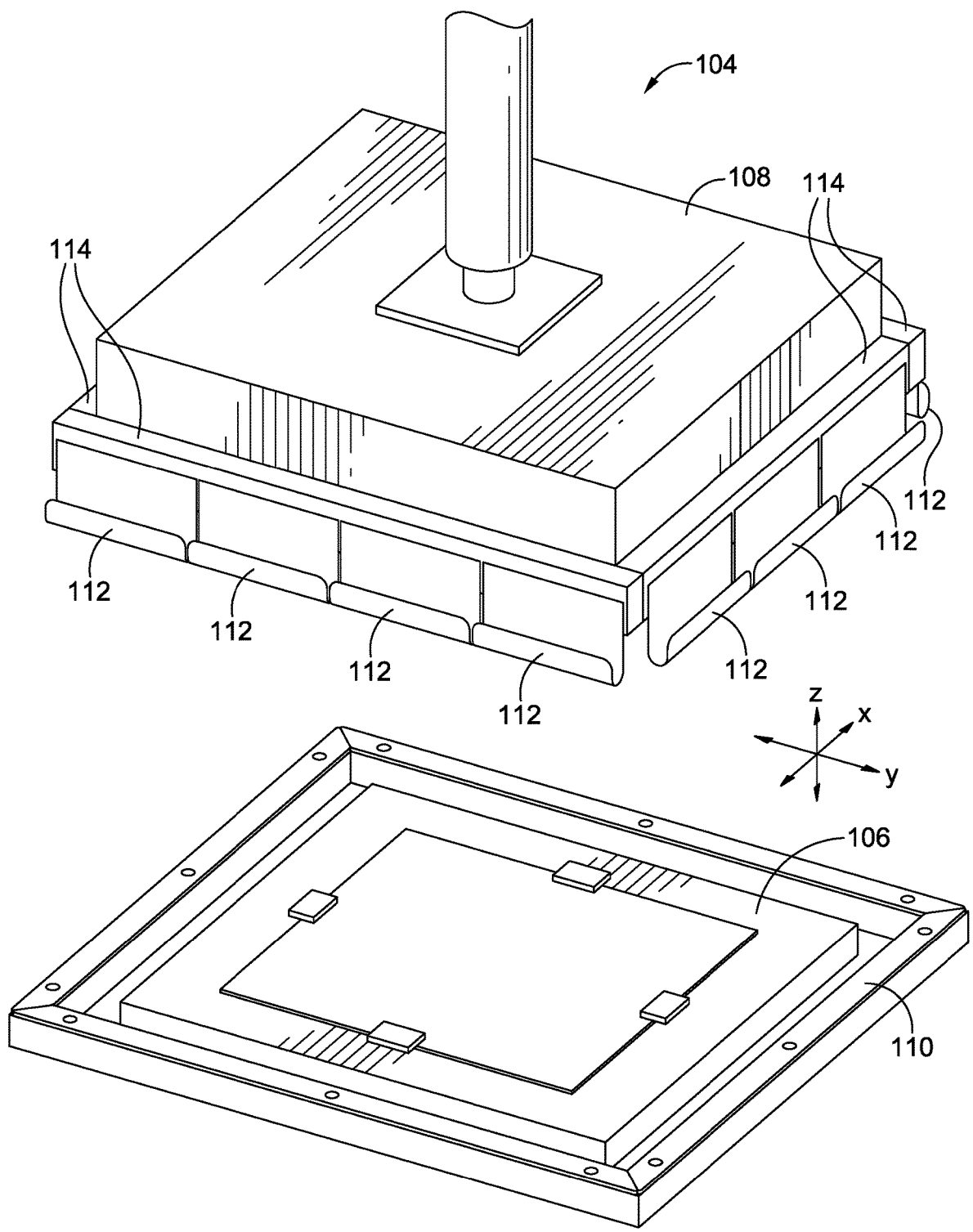
FIGS. 7 and 8 depict another adaptable grounding system in different operational configurations, in accordance with an aspect hereof.
Figure 8:
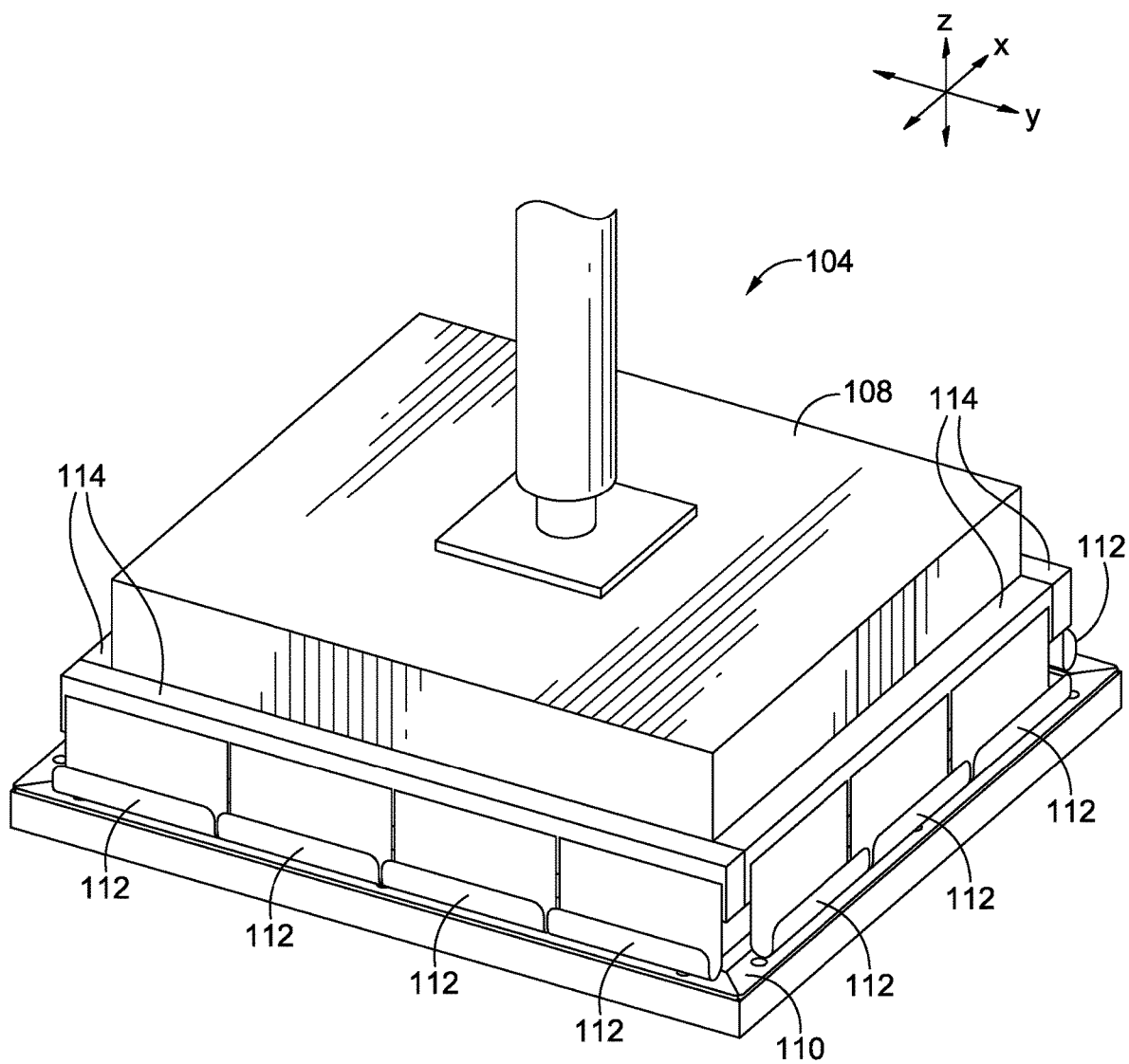

Looking now at FIGS. 7 and 8, an alternative configuration of an adaptable grounding system 104, shown in different configurations, is provided, in accordance with an aspect hereof. The system 104 shown in FIG. 7 includes components similar to other systems described herein. For example, the system 104 includes a structure 106 and an opposite structure 108. The structure 106 and/or the structure 108 may be shiftable to facilitate different configurations, e.g., a spaced-apart configuration (e.g., as shown in FIG. 7) and a contacting configuration suitable for adaptable electrical grounding (e.g., as shown in FIG. 8). In addition, like other aspects herein, the structure 106 includes an electrical-grounding surface 110 that is at least partially exposed, or contactable. However, the structure 108 does not include the plurality of adaptable grounding components 35 shown in FIGS. 4-6. Instead, the system 104 includes a plurality of differently configured adaptable grounding components 112 that are mounted on support structures 114. The adaptable grounding components 112 include curved, or contoured, conductive components 116. The conductive components 116 may be formed of conductive materials, e.g., such as conductive metals, metal alloys, or composites, as described herein, which are suitable for electrical grounding. In addition, portions of the conductive components 116 are J-shaped and/or C-shaped, as shown in FIG. 7. The conductive components 116 may be formed to include a degree of flexibility, e.g., being formed of materials that allow for elastic deformation. As a result, when the adaptable grounding components 112 are shifted into contact with the electrical-grounding surface 110, as shown in FIG. 8, the elastic deformation of the materials forming the conductive components 116 allows for dynamic or adaptable engagement and electrical grounding. In other words, the elastic deformation allows the geometry of the conductive components 116 to change, thereby allowing for more direct, distributed, and/or complete engagement with the electrical-grounding surface 110. It should be noted that while a J-shaped conductive component 116 is shown in FIGS. 7 and 8, similar conductive components of other sizes, shapes, thicknesses, geometries, and/or orientations are contemplated herein, in accordance with other aspects.

Figure 9:
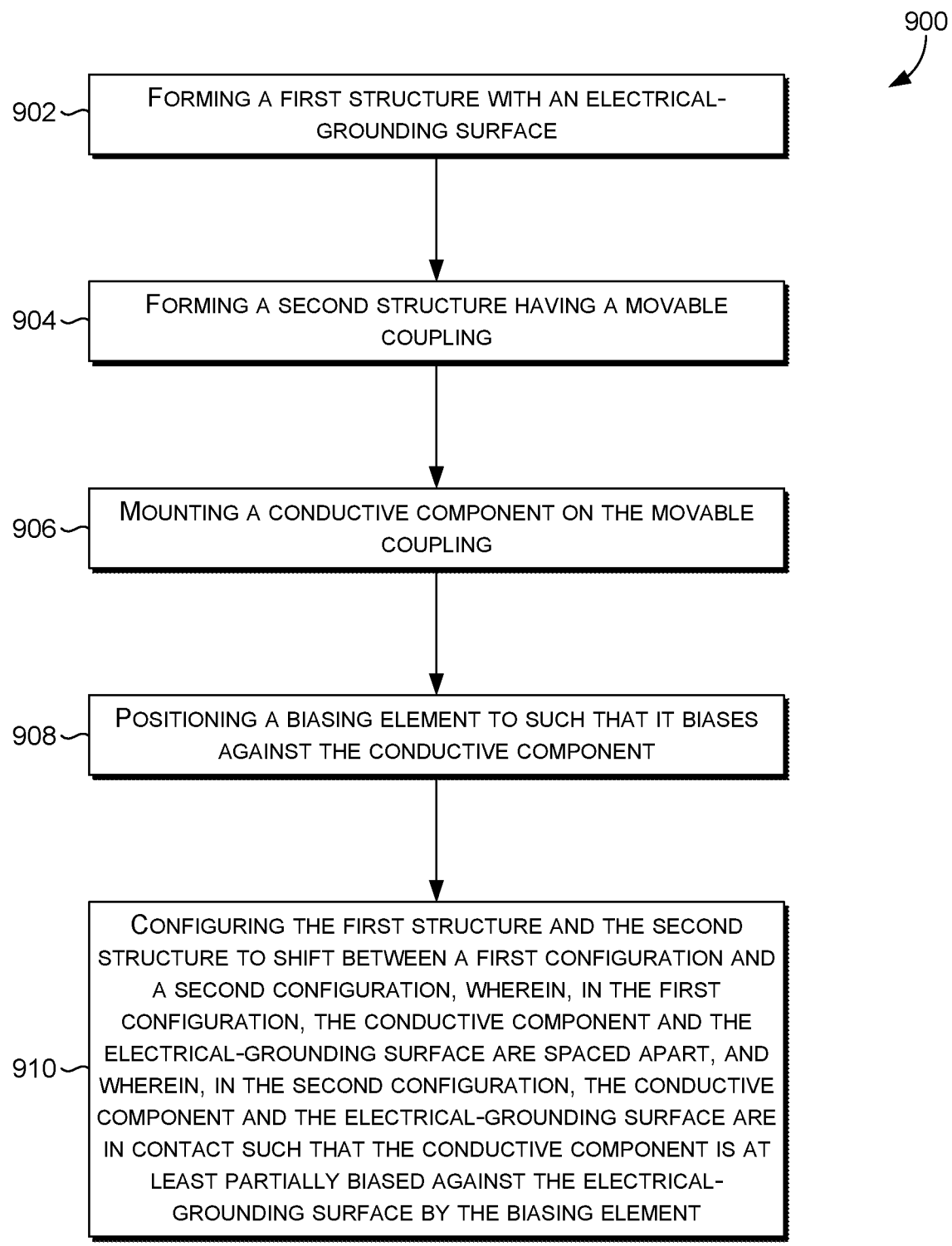
FIG. 9 is a block diagram of a method of manufacturing an adaptable grounding system, in accordance with an aspect hereof.

Looking at FIG. 9, a block diagram of a method 900 of manufacturing an adaptable grounding system is provided, in accordance with an aspect hereof. The method includes blocks 902-910, but is not limited to this combination of elements. In block 902, the method 900 includes forming a first structure, e.g., the structure 12 shown in FIG. 1A, with an electrical-grounding surface, e.g., the electrical-grounding surface 20 shown in FIG. 1A. In block 904, the method 900 includes forming a second structure, e.g., the structure 14 shown in FIG. 1A, having a movable coupling, e.g., the movable coupling 18 shown in FIG. 1A or the movable coupling 40 shown in FIG. 4. In block 906, the method 900 includes mounting a conductive component, e.g., the conductive component 16 shown in FIG. 1A or the conductive component 34 shown in FIG. 4, on the movable coupling. In block 908, the method 900 includes positioning a biasing element, e.g., the biasing element 52 and/or 54 shown in FIG. 2, such that it biases against the conductive component. In block 910, the method 900 includes configuring the first structure and the second structure to shift between a first configuration, e.g., such as that shown in FIG. 1A, and a second configuration, e.g., such as that shown in FIG. 1B, wherein, in the first configuration, the conductive component and the electrical-grounding surface are spaced apart, and wherein, in the second configuration, the conductive component and the electrical-grounding surface are in contact such that the conductive component is at least partially biased against the electrical-grounding surface by the biasing element.

Figure 10:
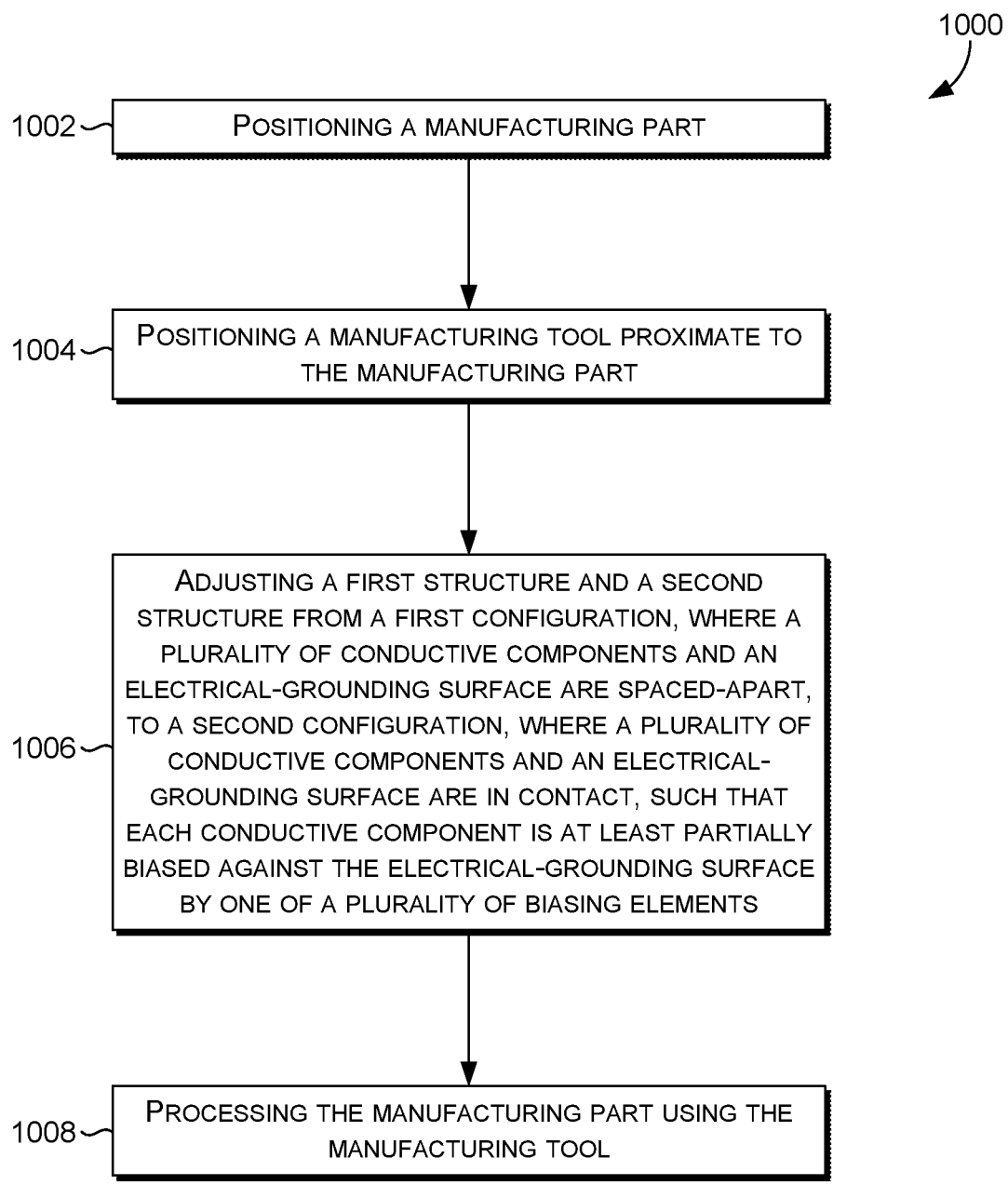
FIG. 10 is a block diagram of a method of using an adaptable grounding system, in accordance with an aspect hereof.

Looking at FIG. 10, a block diagram of a method 1000 of using an adaptable grounding system, e.g., such as the system 80 shown in FIG. 4, is provided, in accordance with an aspect hereof. The method 1000 includes blocks 1002-1008, but is not limited to this combination of elements. In block 1002, the method 1000 includes positioning a manufacturing part, e.g., such as a shoe part, textile, apparel piece, electronic component, or other manufacturing part. In block 1004, the method 1000 includes positioning a manufacturing tool, e.g., such as one that is electrically-driven, e.g., those suited for welding, bonding, cutting, laminating, heating, or another process, proximate to the manufacturing part. In block 1006, the method 1000 includes adjusting a first structure, e.g., such as the structure 12 shown in FIG. 1A, and a second structure, e.g., such as the structure 14 shown in FIG. 1A, from a first configuration, e.g., as shown in FIG. 1A, where a plurality of conductive components, e.g., such as the conductive components 34 shown in FIG. 4, and an electrical-grounding surface, e.g., the electrical-grounding surface 92 shown in FIG. 4, are spaced-apart, to a second configuration, where the plurality of conductive components and the electrical-grounding surface are in contact, such that each conductive component is at least partially biased against the electrical-grounding surface by a corresponding biasing element. In block 1008, the method 1000 includes processing the manufacturing part using the manufacturing tool.

The adaptable engagement provided by the grounding systems and components thereof described herein has been demonstrated through testing to improve electrical grounding, e.g., resulting in reduced electrical arcing. For example, in one instance, this adaptable configuration produced at least a 30% reduction in electrical arcing between components of an electrically-driven manufacturing tool, increasing operational life of such components, e.g., by at least 6-months or greater, among other demonstrated benefits.

The adaptable grounding systems, adaptable grounding components, and methods of manufacturing and using the same described herein may be used in a range of different manufacturing operations and contexts and/or with a range of different manufacturing tools and systems. For example, the aspects described herein may be used in connection with consumer products manufacturing, e.g., such as manufacturing of footwear (e.g., shoe parts), apparel (e.g., clothing), equipment, textiles (e.g., knit, woven, and/or other synthetic or natural textiles), electronics, electronic components, e.g., including semiconductors, mobile device components, or other electronics, and/or in connection with other such manufacturing processes. The aspects described herein may also be used in connection with commercial or industrial manufacturing, e.g., in connection with automotive manufacturing, aerospace manufacturing, power generation equipment manufacturing, or other similar commercial or industrial manufacturing contexts.

Clause 1. A grounding system comprising a first structure comprising a first frame, and an electrical-grounding surface at least partially exposed on the first frame; and a second structure, comprising a second frame, a movable coupling mounted at least partially on the second frame; a conductive component mounted on the movable coupling such that the conductive component is adjustable into different positions on the movable coupling; and a biasing element coupled between the second frame and the conductive component, wherein the first structure and the second structure are adjustable between a first configuration and a second configuration, wherein, in the first configuration, the conductive component and the electrical-grounding surface are spaced apart, and wherein, in the second configuration, the conductive component and the electrical-grounding surface are in contact with the conductive component at least partially biased against the electrical-grounding surface by the biasing element.

Clause 2. The grounding system of clause 1, wherein the conductive component comprises a block formed of silver, brass, copper, nickel, stainless steel, and/or aluminum.

Clause 3. The grounding system of clause 1 or 2, wherein the biasing element comprises one of a pair of biasing elements mounted in spaced-apart relation, and wherein the pair of biasing elements are positioned on opposite sides of the movable coupling so that the pair of biasing elements bias the conductive component in opposite rotational directions.

Clause 4. The grounding system of any of clauses 1-3, wherein the movable coupling comprises a pin and a slot, wherein the pin is constrained by the slot, and is slidable along a length of the slot.

Clause 5. The grounding system of any of clauses 1-4, wherein the slot is formed in the conductive component, and wherein the pin is mounted on the second frame.

Clause 6. The grounding system of any of clauses 1-5, wherein the pin has an exterior comprising a substantially non-conductive material, and wherein the slot has an edge comprising a conductive material.

Clause 7. The grounding system of any of clauses 1-6, further comprising an elongated conductive-element comprising a base and a distal end, wherein the base is coupled to the second frame, and wherein the distal end is positioned in contact with the conductive component.

Clause 8. The grounding system of any of clauses 1-7, wherein the conductive component comprises brass, and wherein the elongated conductive-element comprises beryllium copper.

Clause 9. The grounding system of any of clauses 1-8, wherein the conductive component includes a recess with a sidewall, and wherein the distal end of the elongated conductive-element is positioned in slidable contact with the sidewall, such that the distal end remains in contact with the sidewall during shifting of the conductive component.

Clause 10. The grounding system of any of clauses 1-9, wherein the elongated conductive-element is biased against the sidewall of the recess.

Clause 11. The grounding system of any of clauses 1-10, wherein the biasing of the elongated conductive-element is provided through pre-tensioning of the elongated conductive-element, spring-biasing of the elongated conductive-element, and/or an interference tolerance between the elongated conductive-element and the sidewall.

Clause 12. The grounding system of any of clauses 1-12, further comprising a manufacturing tool coupled to the second structure, wherein the conductive component comprises one of a plurality of conductive components mounted about a perimeter of the second frame and about the manufacturing tool, wherein each conductive component is coupled to a corresponding movable coupling, and wherein each conductive component is biased by a corresponding biasing element.

Clause 13. A method of using a grounding system comprising a first structure having a first frame and an electrical-grounding surface at least partially exposed on the first frame, a second structure having a second frame, a plurality of conductive components each coupled to a corresponding movable coupling, and a plurality of biasing elements each mounted to bias against one of the plurality of conductive components, the method comprising positioning a manufacturing part; positioning a manufacturing tool proximate to the manufacturing part; adjusting the first structure and the second structure from a first configuration, where the plurality of conductive components and the electrical-grounding surface are spaced apart, to a second configuration, where the plurality of conductive components and the electrical-grounding surface are in contact with each conductive component at least partially biased against the electrical-grounding surface by a corresponding biasing element; and processing the manufacturing part using the manufacturing tool.

Clause 14. The method of clause 13, wherein each movable coupling allows the corresponding conductive component to pivot and/or slide.

Clause 15. The method of clause 13 or 14, wherein each biasing element comprises one of a pair of biasing elements that bias the corresponding conductive component in opposite rotational directions about the corresponding movable coupling.

Clause 16. The method of any of clauses 13-15, wherein the first structure is fixed, wherein the second structure is movable, and wherein adjusting between the first configuration and the second configuration comprises shifting the second structure using a translator coupled to the second structure.

Clause 17. The method of any of clauses 13-16, wherein the second structure is fixed, wherein the first structure is movable, and wherein adjusting between the first configuration and the second configuration comprises shifting the first structure using a translator coupled to the first structure.

Clause 18. The method of any of clauses 13-17, wherein the first structure and the second structure are both movable, and wherein adjusting between the first configuration and the second configuration comprises shifting the first structure using a first translator coupled thereto and shifting the second structure using a second translator coupled thereto.

Clause 19. The method of any of clauses 13-18, wherein the grounding system further comprises a plurality of elongated conductive-elements, wherein each elongated conductive-element extends from a corresponding location on the second frame to a corresponding conductive component, and is biased against the corresponding conductive component, such that the elongated conductive-element remains in contact with the corresponding conductive component in both the first configuration and in the second configuration.

Clause 20. A grounding system, comprising a base with an electrical-grounding surface that is at least partially exposed; a housing that is shiftable between a first position and a second position relative to the base; a plurality of movable couplings located about the housing; a plurality of conductive components each mounted on one of the plurality of movable couplings such that each conductive component is adjustable into different positions; a plurality of biasing elements, each biasing element mounted to bias one of the plurality of conductive components at least partially towards the electrical-grounding surface, wherein, when the housing is in the first position, the plurality of conductive components and the electrical-grounding surface are spaced apart, and wherein, when the housing is in the second position, the plurality of conductive components and the electrical-grounding surface are in contact with each conductive component at least partially biased against the electrical-grounding surface by one of the plurality of biasing elements.

Clause 21. A method of manufacturing a grounding system, the method comprising forming a first structure with an electrical-grounding surface; forming a second structure having a movable coupling, wherein at least one of the first structure and the second structure is movable; mounting a conductive component on the movable coupling; positioning a biasing element such that it biases against the conductive component, and configuring the first structure and the second structure to shift between a first configuration and a second configuration, wherein, in the first configuration, the conductive component and the electrical-grounding surface are spaced apart, and wherein, in the second configuration, the conductive component and the electrical-grounding surface are in contact with the conductive structure at least partially biased against the electrical-grounding surface by the biasing element.

Clause 22. A method of assembling a grounding system, the method comprising positioning a first structure having an electrical-grounding surface at a first location; positioning a second structure having a movable coupling at a second location; mounting a conductive component on the movable coupling; positioning a biasing element such that it biases against the conductive component; and configuring the first structure and the second structure to shift between a first configuration and a second configuration, wherein, in the first configuration, the conductive component and the electrical-grounding surface are spaced apart, and wherein, in the second configuration, the conductive component and the electrical-grounding surface are in contact with the conductive structure at least partially biased against the electrical-grounding surface by the biasing element.

Clause 23. A grounding component comprising a conductive component, a movable coupling, at least one biasing element, and at least one elongated conductive-element.

Clause 24. The grounding component of clause 23, wherein the at least one biasing element comprises a pair of biasing elements mountable on opposite sides of the movable coupling, and wherein the at least one elongated conductive-element comprises a pair of elongated conductive-elements positioned on opposite sides of the movable coupling.

Clause 25. The grounding component of clause 23 or clause 24, wherein the conductive component comprises a block formed of brass.

Clause 26. The grounding component of any of clauses 23-25, wherein the at least one elongated conductive-element comprises beryllium copper.

Clause 27. The preceding clauses 1-26 and any elements thereof in any combination.

In some aspects, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some aspects, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C." In addition, this disclosure may use the term "and/or" which may refer to any one or combination of the associated elements.

The subject matter of this disclosure has been described in relation to particular aspects, which are intended in all respects to be illustrative rather than restrictive. In this sense, alternative aspects will become apparent to those of ordinary skill in the art to which the present subject matter pertains without departing from the scope hereof. In addition, different combinations and sub-combinations of elements disclosed, as well as use and inclusion of elements not shown, are possible and contemplated as well.

What is claimed is:
1. A grounding system, comprising:
   a first structure, comprising:
   a first frame, and
   an electrical-grounding surface at least partially exposed on the first frame; and
   a second structure, comprising:
   a second frame,
   a movable coupling mounted at least partially on the second frame;
   a conductive component mounted on the movable coupling such that the conductive component is adjustable into different positions on the movable coupling; and
   a pair of biasing elements mounted to bias against the conductive component, wherein the pair of biasing elements are positioned on opposite sides of the movable coupling such that the pair of biasing elements bias the conductive component in opposite rotational directions, wherein the first structure and the second structure are adjustable between a first configuration and a second configuration, wherein, in the first configuration, the conductive component and the electrical-grounding surface are spaced apart, and wherein, in the second configuration, the conductive component and the electrical-grounding surface are in contact with the conductive component at least partially biased against the electrical-grounding surface by the pair of biasing elements.

2. The grounding system of claim 1, wherein the conductive component comprises a block formed of:
silver,
brass,
copper,
nickel,
stainless steel, and/or
aluminum.

3. The grounding system of claim 1, wherein the movable coupling comprises a pin and a slot, wherein the pin is constrained by the slot, and is slidable along a length of the slot.

4. The grounding system of claim 3, wherein the slot is formed in the conductive component, and wherein the pin is mounted on the second frame.

5. The grounding system of claim 3, wherein the pin has an exterior comprising a substantially non-conductive material, and wherein the slot has an edge comprising a conductive material.

6. The grounding system of claim 1, further comprising an elongated conductive-element comprising a base and a distal end, wherein the base is coupled to the second frame, and wherein the distal end is positioned in contact with the conductive component.

7. The grounding system of claim 6, wherein the conductive component comprises brass, and wherein the elongated conductive-element comprises beryllium copper.

8. The grounding system of claim 6, wherein the conductive component includes a recess with a sidewall, and wherein the distal end of the elongated conductive-element is positioned in slidable contact with the sidewall, such that the distal end remains in contact with the sidewall during shifting of the conductive component.

9. The grounding system of claim 8, wherein the elongated conductive-element is biased against the sidewall of the recess.

10. The grounding system of claim 9, wherein the biasing of the elongated conductive-element is provided through:
pre-tensioning of the elongated conductive-element,
spring-biasing of the elongated conductive-element, and/or
an interference tolerance between the elongated conductive-element and the sidewall.

11. The grounding system of claim 1, further comprising a manufacturing tool coupled to the second structure, wherein the conductive component comprises one of a plurality of conductive components mounted about a perimeter of the second frame and about the manufacturing tool, wherein each conductive component is coupled to a corresponding movable coupling, and wherein each conductive component is biased by a corresponding biasing element.

12. A method of using a grounding system comprising a first structure having a first frame and an electrical-grounding surface at least partially exposed on the first frame, a second structure having a second frame, a plurality of conductive components each coupled to a corresponding movable coupling, and a plurality of biasing elements each mounted to bias against one of the plurality of conductive components, the method comprising:
positioning a manufacturing part;
positioning a manufacturing tool proximate to the manufacturing part;
adjusting the first structure and the second structure from a first configuration, where the plurality of conductive components and the electrical-grounding surface are spaced apart, to a second configuration, where the plurality of conductive components and the electrical-grounding surface are in contact with each conductive component at least partially biased against the electrical-grounding surface by a corresponding biasing element; and
processing the manufacturing part using the manufacturing tool,
wherein each biasing element comprises one of a pair of biasing elements that bias the corresponding conductive component in opposite rotational directions about the corresponding movable coupling.

13. The method of claim 12, wherein each movable coupling allows the corresponding conductive component to pivot and/or slide.

14. The method of claim 12, wherein the first structure is fixed, wherein the second structure is movable, and wherein adjusting between the first configuration and the second configuration comprises shifting the second structure using a translator coupled to the second structure.

15. The method of claim 12, wherein the second structure is fixed, wherein the first structure is movable, and wherein adjusting between the first configuration and the second configuration comprises shifting the first structure using a translator coupled to the first structure.

16. The method of claim 12, wherein the first structure and the second structure are both movable, and wherein adjusting between the first configuration and the second configuration comprises shifting the first structure using a first translator coupled thereto and shifting the second structure using a second translator coupled thereto.

17. The method of claim 12, wherein the grounding system further comprises a plurality of elongated conductive-elements, wherein each elongated conductive-element extends from a corresponding location on the second frame to a corresponding conductive component, and is biased against the corresponding conductive component, such that the elongated conductive-element remains in contact with the corresponding conductive component in both the first configuration and in the second configuration.

18. A grounding system, comprising:
a base with an electrical-grounding surface that is at least partially exposed;
a housing that is shiftable between a first position and a second position relative to the base;
a plurality of movable couplings located about the housing;
a plurality of conductive components each mounted on one of the plurality of movable couplings such that each conductive component is adjustable into different positions, wherein each conductive component is biased towards the electrical-grounding surface by multiple biasing elements coupled against a common side of the conductive component;
wherein, when the housing is in the first position, the plurality of conductive components and the electrical-grounding surface are spaced apart, and wherein, when the housing is in the second position, the plurality of conductive components and the electrical-grounding surface are in contact with each conductive component at least partially biased against the electrical-grounding surface.

* * * * *